US011537301B2

(12) United States Patent
Diril et al.

(10) Patent No.: US 11,537,301 B2
(45) Date of Patent: Dec. 27, 2022

(54) HIGH BANDWIDTH MEMORY SYSTEM WITH DISTRIBUTED REQUEST BROADCASTING MASTERS

(71) Applicant: Meta Platforms, Inc., Menlo Park, CA (US)

(72) Inventors: Abdulkadir Utku Diril, Menlo Park, CA (US); Olivia Wu, Los Altos, CA (US); Krishnakumar Narayanan Nair, Newark, CA (US); Aravind Kalaiah, San Jose, CA (US); Anup Ramesh Kadkol, Sunnyvale, CA (US); Pankaj Kansal, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 59 days.

(21) Appl. No.: 17/307,828

(22) Filed: May 4, 2021

(65) Prior Publication Data

US 2021/0326051 A1 Oct. 21, 2021

Related U.S. Application Data

(63) Continuation of application No. 16/712,253, filed on Dec. 12, 2019, now Pat. No. 11,054,998.

(51) Int. Cl.
*G06F 12/00* (2006.01)
*G06F 3/06* (2006.01)
(Continued)

(52) U.S. Cl.
CPC .......... *G06F 3/0631* (2013.01); *G06F 3/0604* (2013.01); *G06F 3/0673* (2013.01); *G06F 13/1657* (2013.01); *G06F 15/8015* (2013.01); *G06F 15/8023* (2013.01); *G06N 3/02* (2013.01)

(58) Field of Classification Search
CPC .... G06F 3/0631; G06F 3/0604; G06F 3/0673; G06F 13/1657; G06F 15/8015;
(Continued)

(56) References Cited

U.S. PATENT DOCUMENTS 4,514,807 A * 4/1985 Nogi .................... G06F 15/8023
712/21
7,805,578 B2 * 9/2010 Stewart ............... G06F 13/1668
710/305
(Continued)

OTHER PUBLICATIONS

Extended European Search Report for European Application No. 20211459.1, dated May 12, 2021, 11 Pages.

*Primary Examiner* — John A Lane
(74) *Attorney, Agent, or Firm* — Van Pelt, Yi & James LLP

(57) ABSTRACT

A system comprises a processor and a plurality of memory units. The processor is coupled to each of the plurality of memory units by a plurality of network connections. The processor includes a plurality of processing elements arranged in a two-dimensional array and a corresponding two-dimensional communication network communicatively connecting each of the plurality of processing elements to other processing elements on same axes of the two-dimensional array. Each processing element that is located along a diagonal of the two-dimensional array is configured as a request broadcasting master for a respective group of processing elements located along a same axis of the two-dimensional array.

20 Claims, 8 Drawing Sheets

(51) Int. Cl.
*G06F 13/16* (2006.01)
*G06F 15/80* (2006.01)
*G06N 3/02* (2006.01)

(58) Field of Classification Search
CPC .. G06F 15/8023; G06F 3/02; G06F 15/17381; G06F 15/163; G06F 15/781; G06F 15/7825; G06N 3/0454; G06N 3/063
See application file for complete search history.

(56) References Cited

U.S. PATENT DOCUMENTS

| | | |
|---|---|---|
| 8,131,975 B1 * | 3/2012 | Cismas ............... G06F 15/8023 712/16 |
| 8,145,880 B1 | 3/2012 | Cismas |
| 9,026,744 B2 | 5/2015 | Hofmann |
| 9,449,257 B2 | 9/2016 | Shi |
| 2014/0310495 A1 * | 10/2014 | Michelogiannakis ....................... G06F 13/1626 711/167 |
| 2015/0089164 A1 | 3/2015 | Ware |
| 2017/0090793 A1 | 3/2017 | Yang |
| 2017/0311059 A1 * | 10/2017 | Beshai ............... H04Q 11/0005 |
| 2018/0143921 A1 * | 5/2018 | Jiang .................. G06F 13/4018 |
| 2018/0267929 A1 | 9/2018 | Li |
| 2018/0321880 A1 | 11/2018 | Jung |
| 2019/0196721 A1 | 6/2019 | Magro |
| 2020/0201642 A1 | 6/2020 | Dupont de Dinechin |
| 2020/0218965 A1 * | 7/2020 | Sankaralingam ...... G06N 3/063 |
| 2020/0293487 A1 | 9/2020 | Anderson |

\* cited by examiner

HIGH BANDWIDTH MEMORY SYSTEM WITH DISTRIBUTED REQUEST BROADCASTING MASTERS

CROSS REFERENCE TO OTHER APPLICATIONS

This application is a continuation of U.S. patent application Ser. No. 16/712,253 entitled HIGH BANDWIDTH MEMORY SYSTEM WITH DISTRIBUTED REQUEST BROADCASTING MASTERS filed Dec. 12, 2019 which is incorporated herein by reference for all purposes.

BACKGROUND OF THE INVENTION

A whole class of complex artificial intelligence problems can be solved using neural networks. Since these problems are often computationally and data intensive, hardware solutions are often beneficial for improving the performance of neural networks. Solving these complex problems typically requires processing large amounts of data. Due to these data requirements, the performance of memory-based operations is critical. Processing large amounts of data often involves a corresponding large number of memory transfers. It is a technical challenge to create a hardware platform for solving neural networks while achieving memory access performance and efficiency requirements. Therefore, there exists a need for a hardware platform that minimizes the expense of memory transfers to effectively perform memory operations needed for neural network processing.

BRIEF DESCRIPTION OF THE DRAWINGS

Various embodiments of the invention are disclosed in the following detailed description and the accompanying drawings.

DETAILED DESCRIPTION

Figure 1:
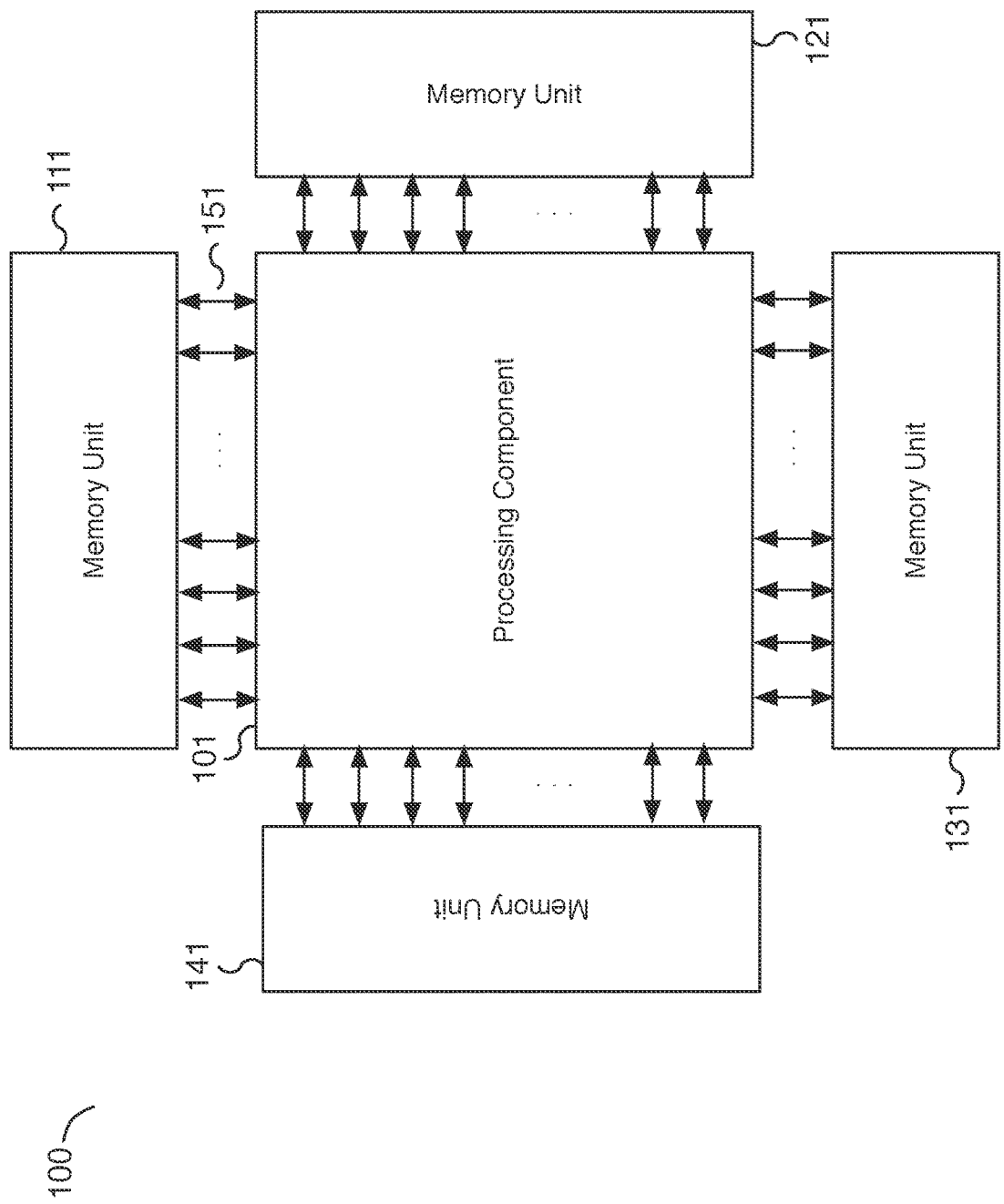
FIG. 1 is a block diagram illustrating an embodiment of a system for solving artificial intelligence problems using a neural network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A high bandwidth memory system utilizing request broadcasting masters is disclosed. To increase bandwidth to memory, a processor system is communicatively connected to multiple memory units. In some embodiments, the memory units are arranged surrounding a processing component. For example, the processing component can be arranged in a central location relative to the multiple memory units, which may include separate north, east, south, and west memory units. The processing component can be a processor with multiple processing elements, where each processing element includes its own control logic and matrix compute engine. The processing elements are arranged in a two-dimensional array, such as an 8×8 matrix of processing elements. Other appropriate numbers of processing elements can be utilized as well. The processing elements of the processor can work together in parallel by applying a neural network to solve complex artificial intelligence problems. A network connects the processing elements to one another and to the memory units. For example, an 8×8 matrix of processing elements (64 total processing elements) is connected by an 8×8 network, such as a network-on-chip subsystem. Each processing element can send data to other processing elements and/or access one of the memory units via the network. In some embodiments, a request broadcasting master is designated for a group of processing elements. The request broadcasting master serves as a master to manage the memory access requests of the processing elements in the group. For example, a request broadcasting master is designated for each row of processing elements, where the group is every processing element in the row. Alternatively, the group can be every processor in a column and a request broadcasting master is designated for each column of processing elements. Any memory request from a processor in a group is managed by the request broadcasting master of the group. In various embodiments, each processing element in the group sends its memory requests to its request broadcasting master. The request broadcasting master merges all memory requests from the processing elements of the group into a compressed memory access request. The compressed memory access request reduces the number of total memory access requests but each memory access request may be for more data. The request broadcasting master directs the merged memory access request to memory units. In some embodiments, the merged memory access request is broadcasted to all memory units. For example, the merged memory access request is transmitted along the row and column of the network subsystem to memory units on the north, east, south, and west side of the processing component.

In various embodiments, memory access requests to memory units are directed to memory units only by request broadcasting masters and not by each processing element. By designating specific request broadcasting masters and compressing memory requests into fewer (but larger) requests, the total number of memory requests on the network at any one time is minimized. The reduction in messages significantly improves the efficiency of memory transfers in part by minimizing network collisions. In various embodiments, each memory unit responds to its responsible portion of a memory access request. For example, a north memory unit responds to only the portion of the request the north memory unit is responsible for. Similarly, east, south, and west memory units respond to only the portion of the request that they are respectively responsible for. In various embodiments, the requested data addresses for a single memory access request are distributed across the different memory units. The distribution may be performed using a dynamically programmable distribution scheme. By spreading data across multiple memory units using a dynamically programmable distribution scheme, for example, based on workload, memory utilization and efficiency is increased and processing elements with different workloads can avoid operating in lockstep with one another.

In some embodiments, request broadcasting masters for each group of processing elements are arranged offset from one another in the network subsystem. For example, each request broadcasting master is arranged to minimize network overlap with the other request broadcasting masters and is located at a different (row, column) position in the network array or grid. In some embodiments, the request broadcasting masters can be placed along the diagonal of the network grid. For example, for an 8×8 network, request broadcasting masters can be placed along either diagonal. For a diagonal traversing from the upper left to lower right, the upper leftmost request broadcasting master transmits and receives memory requests to and from memory units using the top row and left column of the network. Similarly, the lower rightmost request broadcasting master transmits and receives memory requests to and from memory units using the bottom row and right column of the network. Each request broadcasting master along the diagonal has a dedicated column and row for providing memory access requests to and for receiving memory access responses from the different memory units. Once a memory access response is received, the request broadcasting master can provide the response to the appropriate requesting processing element of the group. In various embodiments, the request broadcasting master and the processing elements of the group implement a group protocol to coordinate the merging of memory access requests and the receiving of responses. For example, the request broadcasting master and each processing element may perform a handshake to coordinate memory access requests and responses.

In some embodiments, a processor system includes a plurality of memory units and a processor coupled to each of the plurality of memory units by a plurality of network connections. For example, a processor or processing component is surrounded by memory units on four sides and has multiple network connections to each memory unit. The processor includes a plurality of processing elements arranged in a two-dimensional array, such as a two-dimensional matrix or grid of processing elements. In some embodiments, the two-dimensional array is not a strict rectangular grid but another appropriate ordered arrangement of processing elements. The processor includes a corresponding two-dimensional communication network communicatively connecting each of the plurality of processing elements to other processing elements on same axes of the two-dimensional array. For example, a network-on-chip subsystem connects the processing elements arranged in the same column and those arranged in the same row. In some embodiments, each processing element of the plurality of processing elements located along a diagonal of the two-dimensional array is configured as a request broadcasting master for a respective group of processing elements of the plurality of processing elements located along a same axis of the two-dimensional array. For example, processing elements arranged along the same row (or column) form a group of processing elements. Each group has a designated request broadcasting master. The request broadcasting masters are located along a diagonal of the processing elements array. For example, no two request broadcasting masters share the same row or the same column.

In some embodiments, each processing element of the processing component can be configured with a distribution scheme to scatter data across the available memory units. The distribution scheme is dynamically programmable such that different processing elements can apply the same or different distribution schemes. For example, in various embodiments, each processing element can be programmed using a processor instruction to dynamically configure the distribution scheme for that processing element. In various embodiments, processing elements sharing the same workload can be programmatically configured to utilize the same distribution scheme and processing elements with different workloads can be programmatically configured to utilize different distribution schemes. Different distribution schemes help to prevent multiple processing elements from working in lockstep with one another. By varying the distribution schemes, the memory units are more efficiently utilized and memory performance is increased. In some embodiments, the size of the memory unit access units is also configurable. For example, the size of the memory unit access units can be programmatically configured via a processor instruction. Each processing element can read and/or write data to each memory unit via a request broadcasting master using a configurable access unit-sized group. Moreover, memory access operations can span multiple access units and reference data distributed across multiple memory units. In various embodiments, each memory access request is broadcasted to all memory units and each memory unit returns partial responses that are combined to fulfill the broadcasted request.

In some embodiments, a processor system comprises a plurality of memory units and a processor coupled to the plurality of memory units. For example, a processor system includes a processor communicatively connected to multiple memory units. In some embodiments, the memory units are arranged on all sides of the processor to help minimize latency from the processor to each memory unit. Each of the plurality of memory units includes a request processing unit and a plurality of memory banks. For example, a request processing unit receives memory access requests, such as read and/or write requests, and determines whether and how to process the requests. The request processing unit can determine whether a portion of the memory access request can be served by the memory unit and its corresponding memory banks. For example, the request processing unit can decompose a memory access request into partial requests and determine what subset of the partial requests may be served from the corresponding memory banks of the memory unit. In various embodiments, each memory unit can include multiple memory banks to increase the memory size of a memory unit. For example, a memory unit can include 4, 8, 16, 32, or another appropriate number of memory banks. In some embodiments, the processor includes a plurality of processing elements. For example, the processor is a processing component that includes a group of processing elements. The processing elements may be arranged in a matrix, such as an 8×8 array of processing elements. The processor also includes a communication network communicatively connecting the plurality of processing elements to the plurality of memory units. For example, a communication network such as a network-on-chip subsystem and/or network interfaces/buses communicatively connect each processing element to each memory unit. In some embodiments, each processing element of the plurality of processing elements includes a control logic unit and a matrix compute engine. For example, a first processing element of the plurality of processing elements includes a control logic for controlling the first processing element and a matrix compute engine for computing matrix operations. The control logic is configured to access data from the plurality of memory units using a dynamically programmable distribution scheme. For example, the control logic is configured using a processor instruction to utilize a specific distribution scheme or pattern. The scheme may be based on the processing element workload or another appropriate configuration. The distribution scheme determines the mapping of memory addresses specific to the processing element to memory locations of the memory units.

FIG. 1 is a block diagram illustrating an embodiment of a system for solving artificial intelligence problems using a neural network. In the example shown, the system 100 is a hardware platform that includes processing component 101 and memory units 111, 121, 131, and 141. Processing component 101 is communicatively connected to memory units 111, 121, 131, and 141 via a network connection such as network connections 151. Network connections 151 communicatively connects processing component 101 to north memory unit 111. Similar network connections (not labeled) connect processing component 101 to memory unit 121, 131, and 141. Processing component 101 is connected to and can communicate with each of memory unit 111, 121, 131, and 141 simultaneously. The memory units 111, 121, 131, and 141 are positioned around processing component 101 at north, east, south, and west positions but other layouts are appropriate. By positioning memory units 111, 121, 131, and 141 around processing component 101, memory units 111, 121, 131, and 141 can be accessed simultaneously by processing component 101 and/or multiple connections may be used by processing component 101 to communicate with different memory units 111, 121, 131, and 141 in parallel. In the example shown, system 100 includes four memory units that surround a processing component but fewer or more memory units may be utilized as appropriate.

In some embodiments, processing component 101 is a processor that includes one or more processing elements (not shown). Each processing element may include at least a matrix compute engine for performing matrix operations. The processing elements may be further communicatively connected using a communication network and/or bus such as a network-on-chip subsystem. Data for performing neural network operations may be retrieved from and written to memory units such as memory units 111, 121, 131, and 141 located around processing component 101. For example, using a network-on-chip subsystem, memory access operations can be directed to memory, including memory units 111, 121, 131, and 141, from a processing element of processing component 101 via a request broadcasting master. The request broadcasting master merges memory requests from a group of processing elements. Responses to the requests are received by the request broadcasting master and transmitted to the original requesting processing element(s) of the group. In some embodiments, each processing element can be assigned a particular workload and each workload may be associated with a particular set of data stored in memory. For example, the set of data for a workload may include activation and/or filter matrix data. In various embodiments, the data is associated with large neural network matrices and may include hundreds or more matrix elements. The relevant data may be stored across different regions of memory units 111, 121, 131, and 141. In some embodiments, the data is stored in access unit-sized groups distributed across memory units 111, 121, 131, and 141 based on a dynamically programmable distribution scheme.

In some embodiments, processing component 101 is communicatively connected to memory units 111, 121, 131, and 141 via a set of network/bus connections such as network connections 151 on the north side of processing component 101. For example, a network-on-chip subsystem of processing component 101 includes a network array or grid that connects an array of processing elements of processing component 101. In some embodiments, each column of the network grid is connected to memory unit 111 on the north side of processing component 101 and to memory unit 131 on the south side of processing component 101. Similarly, each row of the network grid is connected to memory unit 121 on the east side of processing component 101 and to memory unit 141 on the west side of processing component 101. In some embodiments, the number of external network connections on each side of processing component 101 matches the number of input/output connections of each memory unit. For example, network connections 151 may include 32 network connections from processing component 101 to memory unit 111, one connection of network connections 151 matching each north-side external network connection of processing component 101 to an input/output connection of memory unit 111.

In some embodiments, the data stored in memory units 111, 121, 131, and/or 141 may be accessed by workload or another appropriate identifier. For example, a workload identifier may be used to determine how to distribute and retrieve data across the different available memory units. In various embodiments, different workloads are programmed to distribute their corresponding workload data across available memory units using different distribution schemes. For example, each workload can be dynamically programmed to use a different distribution scheme. In various embodiments, a distribution scheme uses a configurable ordered pattern for accessing memory units. Instead of using a predefined distribution for all workloads, a processing element can be dynamically programmed to distribute data differently from other processing elements. This allows for better utilization and efficiency of the memory units. In various embodiments, the data associated with a memory access operation may reside in one or more different memory units. For example, a memory read request may be served by data located in memory units 111, 121, and 131. A different memory request may be served by data in memory units 121, 131, and 141. In some embodiments, a hash function, such as a programmable hash function, is used to determine the memory layout scheme or access order pattern for a particular workload or identifier. For example, a memory read request for one processing element may access memory units using a repeating ordered pattern starting with memory unit 111 followed by memory unit 121, memory unit 131, and memory unit 141. A memory read request for a different processing element may use a different programmable repeating ordered pattern starting with memory unit 141 followed by memory unit 121, memory unit 131, and memory unit 111. Since data is distributed across different memory units, a memory request can trigger one or more partial responses from different memory units that each respond to a portion of the memory request. Once all partial responses have been received by a processing element, the memory request is complete.

In some embodiments, a memory access operation, such as a write or read memory access operation, can be split into multiple partial access requests. The memory access operation may be a merged memory access operation that includes (and compresses) requests from multiple processing elements. In some embodiments, the memory access operation is decomposed or unrolled into one or more partial access requests by memory units 111, 121, 131 and/or 141. Based on the memory range requested, a memory unit determines whether it contains the requested data. In some embodiments, the memory request is processed by a request processing unit of the memory unit (not shown). For example, in some embodiments, a memory request is broadcasted to all memory units and is processed by the corresponding request processing unit of each memory unit. Each request processing unit analyzes the request and different request processing units respond to different portions of the memory request. For example, a request processing unit responds only to requests for data or memory addresses associated with its memory unit. In the event a memory access request can be served by a particular memory unit, the associated request processing unit can retrieve the relevant data from (or write the relevant data to) the associated memory unit. Memory access requests that cannot be served by the particular memory unit can be ignored and will be handled by the corresponding appropriate memory unit. In some embodiments, each memory unit contains multiple memory banks and the request processing unit can direct the partial memory access request to the appropriate memory bank of the memory unit.

In some embodiments, the size of a data access unit used by each memory unit is programmable. For example, memory units can be programmed to use a 128 byte or another appropriately sized access unit such that every new group of 128 bytes (or another appropriate access unit size) is stored on a different memory unit based on the programmable distribution scheme. This allows the data to be written across different memory units using programmable sized access units. For example, the first access unit of data is written to a first memory unit, the second access unit of data is written to a second memory unit, and so forth, as determined by the ordering of the distribution scheme. Once all memory units have been utilized, the next memory unit cycles back to the first memory unit. In various embodiments, the order of the memory units can also be programmable and may be determined using a hashing function. For example, each workload may utilize a different distribution order for accessing memory units based on the outcome of the hashing function.

Figure 2:
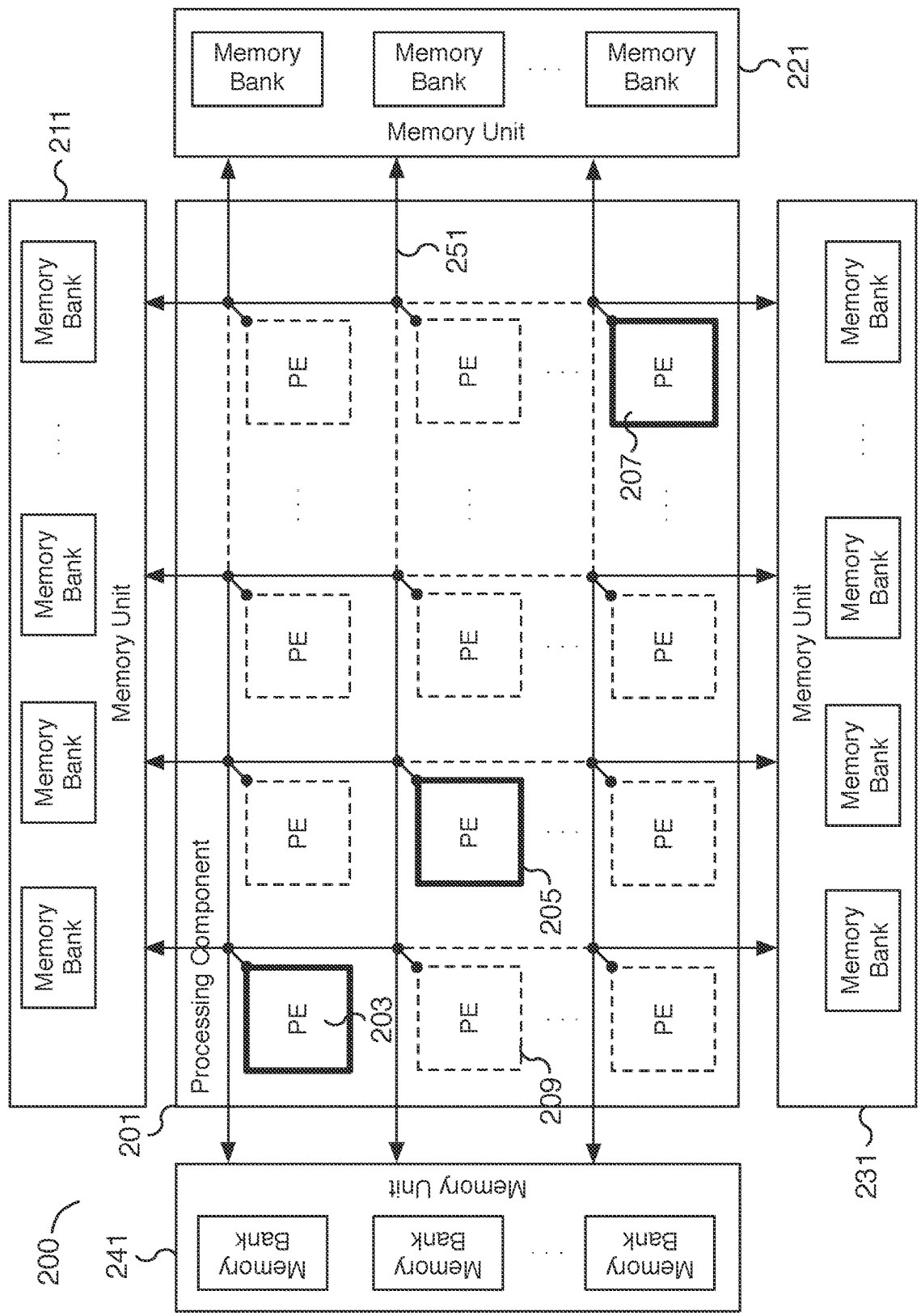
FIG. 2 is a block diagram illustrating an embodiment of a system for solving artificial intelligence problems using a neural network.

FIG. 2 is a block diagram illustrating an embodiment of a system for solving artificial intelligence problems using a neural network. In the example shown, the system 200 is a hardware platform that includes processing component 201 and memory units 211, 221, 231, and 241. Processing component 201 is communicatively connected to memory units 211, 221, 231, and 241 via multiple network connections. Processing component 201 includes an array of processing elements (each labeled "PE"), including processing elements 203, 205, 207, and 209. Processing elements in bold, such as processing elements 203, 205, and 207, are processing elements designated as request broadcasting masters. Some processing elements are shown with dashed lines to reflect the additional number of processing elements to fill out an array of processing elements and are processing elements that do not function as request broadcasting masters. The ellipses between processing elements indicate additional rows or columns of processing elements. The size of the array of processing elements can vary as appropriate. In some embodiments, processing component 201 includes an 8×8, 16×16, 32×32, or another appropriate sized array of processing elements. In the example shown, network subsystem 251 communicatively connects the processing elements of processing component 201 to one another and to memory units 211, 221, 231, and 241. On each side of processing component 201, multiple network connections connect processing component 201 to a memory unit. In some embodiments, system 200 is system 100 of FIG. 1, processing component 201 is processing component 101 of FIG. 1, and memory units 211, 221, 231, and 241 are memory units 111, 121, 131, and 141, respectively, of FIG. 1.

In some embodiments, memory units are located on each of the four sides of processing component 201. For example, memory unit 211 is located on the north side of processing component 201, memory unit 221 is located on the east side of processing component 201, memory unit 231 is located on the south side of processing component 201, and memory unit 241 is located on the west side of processing component 201. Each memory unit includes multiple memory banks. In the example shown, each memory unit is depicted with four memory banks but each can be configured with another appropriate number of memory banks. The ellipses between memory banks of the same memory unit indicate optional additional memory banks. In some embodiments, each memory unit is communicatively connected to a side of processing component 201 by multiple network connections/interfaces. Memory requests and corresponding responses for each memory unit can be transmitted via any of the network connections of a memory unit. By utilizing multiple network connections for each memory bank, a memory unit can receive memory requests from and respond with memory responses to multiple processing elements in parallel. The multiple network connections for each memory unit increase the overall memory bandwidth.

In some embodiments, network subsystem 251 is a network-on-chip subsystem that connects each of the processing elements of processing component 201 to one another. Network subsystem 251 is an array or grid network with communication lines arranged along the columns and rows corresponding to the processing element array. Network subsystem 251 is further communicatively connected to memory units 211, 221, 231, and 241. The network communication lines for each column and row connect to input/output interfaces of the memory units. For example, the network communication lines for each column connect to memory unit 211 on the north side of processing component 201 and to memory unit 231 on the south side of processing component 201. Similarly, the network communication lines for each row connect to memory unit 221 on the east side of processing component 201 and to memory unit 241 on the west side of processing component 201. In various embodiments, the number of column communication lines corresponds to the number of input/output interfaces of memory units 211 and 231. The number of row communication lines corresponds to the number of input/output interfaces of memory units 221 and 241. Although system 200 is depicted with four memory units, in some embodiments, the total memory units may be a subset of the memory units shown in FIG. 2. For example, memory units may only be located on two or three sides of processing component 201 and corresponding network communication lines of network subsystem 251 may only include network interfaces to access memory units where appropriate. A system configured with only three memory banks may have network communication lines/interfaces to connect to memory units on only three sides of the processing component.

In some embodiments, the processing elements are arranged into groups by rows (or columns). For example, each row of processing elements is designated as a group. One of the processing elements in the group is designated as the request broadcasting master. For example, processing element 203 is the request broadcasting master for the processing element group corresponding to the first row of processing elements. Similarly, processing element 205 is the request broadcasting master for the processing element group corresponding to the second row of processing elements. For the last row of processing elements, processing element 207 is the request broadcasting master for the group. The designated request broadcasting masters are aligned along the diagonal of the array of processing elements. In the example shown, request broadcasting masters 203, 205, and 207 are located along a diagonal, traversing from the upper left to lower right, of the processing elements array. In some embodiments, the request broadcasting masters are located along a different diagonal, such as the diagonal traversing from the lower left to the upper right of the processing elements array. In some embodiments, the groups are defined by columns instead of rows and a single request broadcasting master is designated for each column group of processing elements. Memory requests and responses from a processing element are directed using the request broadcasting master. Requests are transmitted to the request broadcasting master where they are forwarded to memory units. Responses from memory units are received by the request broadcasting master and transmitted to the originating processing element.

In some embodiments, each processing element of an array forwards memory requests to the request broadcasting master of the group, such as request broadcasting masters 203, 205, and 207. Processing elements that are not request broadcasting masters do not directly communicate with memory units. For example, processing element 209 forwards all of its memory access requests to request broadcasting master 205. Each request broadcasting master then broadcasts the memory request to all memory units. For example, a memory access request is broadcasted using network subsystem 251 to memory units 211, 221, 231, and 241. The request is broadcasted to north and south memory units, memory units 211 and 231, respectively, via a network connection traversing along the column direction of network subsystem 251. The request is also broadcasted to east and west memory units, memory units 221 and 241, respectively, via a network connection traversing along the row direction of network subsystem 251. Each request broadcasting master broadcasts memory requests in all directions towards all memory units using network subsystem 251. In various embodiments, the memory access requests may be read and/or write requests. Since the request broadcasting masters are located along the diagonal of the processing elements array, their respective broadcasts have minimal overlap and likelihood of collision with one another. Each request broadcasting master communicates with a memory unit using a different network interface. In some embodiments, all request broadcasting masters can communicate with the same memory unit in parallel. In response to a memory access request, memory units provide responses that are transmitted back to the request broadcasting master using the same route but in a reverse direction. By using the same route, responses directed to different request broadcasting masters have minimal overlap and likelihood of collision with one another. Since each request broadcasting master has its own dedicated route on network subsystem 251 for broadcasting requests and receiving responses, the likelihood of network collisions is significantly reduced.

In some embodiments, each of the request broadcasting masters of a group receive and then merge the memory access requests from the processing element of its group. For example, a memory request received by request broadcasting master 205 from processing element 209 is merged by request broadcasting master 205 with one or more memory requests from processing elements of the same group. By merging memory requests, the total number of broadcasted requests are reduced, further reducing network traffic and the likelihood of collisions. Since data may be distributed across multiple memory units, multiple memory units may service the memory requests by sending partial responses addressing only the portions of the memory request each memory unit is responsible for.

In some embodiments, memory units 211, 221, 231, and 241 each receive broadcasted memory access requests from a request broadcasting master of processing component 201. The memory access requests may be read and/or write requests. Each of memory units 211, 221, 231, and 241 decomposes the memory access request to determine whether it can be served, potentially partially, by one of its memory banks. Although four memory banks are shown in FIG. 2 for each memory unit, in various embodiments, memory unit 211, 221, 231, and 241 can include fewer or many more memory banks such as 8, 16, 32, 64, or another appropriate number of memory banks. In some embodiments, whether a memory unit can service a portion of a memory request is determined using a hashing function to implement a dynamically programmable distribution scheme. For example, the hashing function may utilize a workload identifier of a processing element to distribute data across memory units and banks based on a processing element's workload. In some embodiments, the hashing function inspects a set of bits, such as two or more bits, of a memory address associated with the memory access request.

In some embodiments, the memory read/write size, such as the size of a memory access unit, can be programmable. For example, memory reads can be programmed to be 64 bytes, 128 bytes, or another appropriate access unit size. Each memory unit can determine the appropriate bytes to read and/or write by analyzing each incoming memory access request. In the event a request can be served by the memory unit, such as memory unit 211, 221, 231, or 241, a memory request response will be returned to processing component 201 and the appropriate requesting processing element(s) via the corresponding request broadcasting master. In some embodiments, prepared responses may include data read from a memory bank. The response may be a partial response that fulfills only a portion of the original memory access request. Additional partial responses may be fulfilled by other memory units responsible for managing the corresponding memory address ranges. For example, a large memory read request broadcasted to all memory units may be fulfilled by multiple partial responses supplied by multiple memory units. In some embodiments, each partial response includes an identifier such as a sequence identifier that may be used to order the partial responses. For example, partial responses may not be received in order and an identifier is used to sort the partial responses and build a complete response from multiple partial responses.

Figure 3:
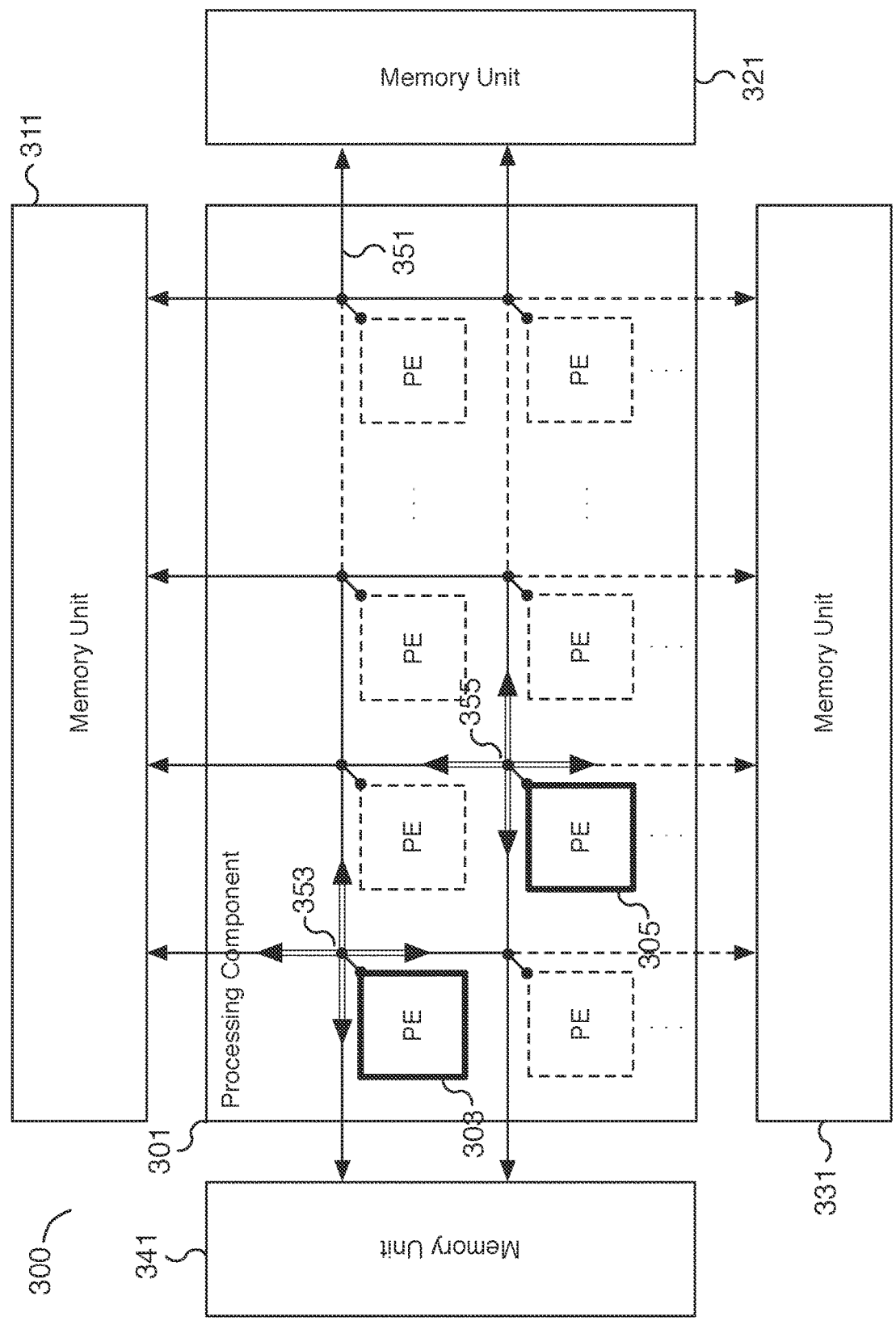
FIG. 3 is a block diagram illustrating an embodiment of a system for solving artificial intelligence problems using a neural network.

FIG. 3 is a block diagram illustrating an embodiment of a system for solving artificial intelligence problems using a neural network. In the example shown, the system 300 is a hardware platform that includes processing component 301 and memory units 311, 321, 331, and 341. Processing component 301 is communicatively connected to memory units 311, 321, 331, and 341 via multiple network connections. Processing component 301 includes an array of processing elements (each labeled "PE"), including processing elements 303 and 305. Processing elements in bold, such as processing elements 303 and 305, are processing elements designated as request broadcasting masters. Some processing elements are shown with dashed lines to reflect the additional number of processing elements to fill out an array of processing elements and are processing elements that do not function as request broadcasting masters. The ellipses between processing elements indicate additional rows or columns of processing elements. The size of the array of processing elements can vary as appropriate. In some embodiments, processing component 301 includes an 8×8, 16×16, 32×32, or another appropriate sized array or grid of processing elements. In the example shown, network subsystem 351 communicatively connects the processing elements of processing component 301 to one another and to memory units 311, 321, 331, and 341. On each side of processing component 301, multiple network connections connect processing component 301 to a memory unit. Processing element and request broadcasting master 303 broadcasts a memory access request to memory units 311, 321, 331, and 341 using network route 353 on network subsystem 351. Processing element and request broadcasting master 305 broadcasts a memory access request to memory units 311, 321, 331, and 341 using network route 355 on network subsystem 351. In some embodiments, system 300 is system 100 of FIG. 1, processing component 301 is processing component 101 of FIG. 1, and memory units 311, 321, 331, and 341 are memory units 111, 121, 131, and 141, respectively, of FIG. 1. In some embodiments, system 300 is system 200 of FIG. 2, processing component 301 is processing component 201 of FIG. 2, memory units 311, 321, 331, and 341 are memory units 211, 221, 231, and 241, respectively, of FIG. 2, and network subsystem 351 is network subsystem 251 of FIG. 2.

In some embodiments, processing elements of the same processing element group transmit memory requests to a request broadcasting master, such as request broadcasting master 303 or 305. The request broadcasting master merges the received requests from the processing elements of its group. In some embodiments, the merged memory request is a compressed version of the original individual memory requests. For example, the compressed or merged memory request may reduce duplicative requests, that is, requests from different processing elements of the same group that overlap in requested data. In various embodiments, each request may include an identifier associated with a configurable distribution scheme for distributing data across memory units. Once merged, the memory request is broadcasted over network subsystem 351 using a network route. For example, request broadcasting master 303 utilizes network route 353 to broadcast memory access requests for memory units 311, 321, 331, and 341. A request is broadcasted along a dedicated column and row of network subsystem 351. Similarly, request broadcasting master 305 utilizes network route 355 to broadcast memory access requests for memory units 311, 321, 331, and 341. The points of collision for network route 353 and network route 355 are minimal since request broadcasting master 303 and request broadcasting master 305 are located at different row and column locations from one another. By locating the request broadcasting masters along a diagonal of the processing elements array, collisions between requests and responses are significantly reduced. The responses from memory units 311, 321, 331, and 341 utilize the same network route to respond to requests but travel in the reverse direction. For example, memory unit 311 utilizes the same network interface associated with network route 353 to respond to requests from which a memory request is received to direct a response back to request broadcasting master 303. As another example, memory unit 311 utilizes the same network interface associated with network route 355 to respond to requests from which a memory request is received to direct a response back to request broadcasting master 305. Since the return routes for responses from memory unit 311 to request broadcasting master 303 and request broadcasting master 305 do not overlap, network collisions are minimized and the effective memory bandwidth is increased.

Figure 4:
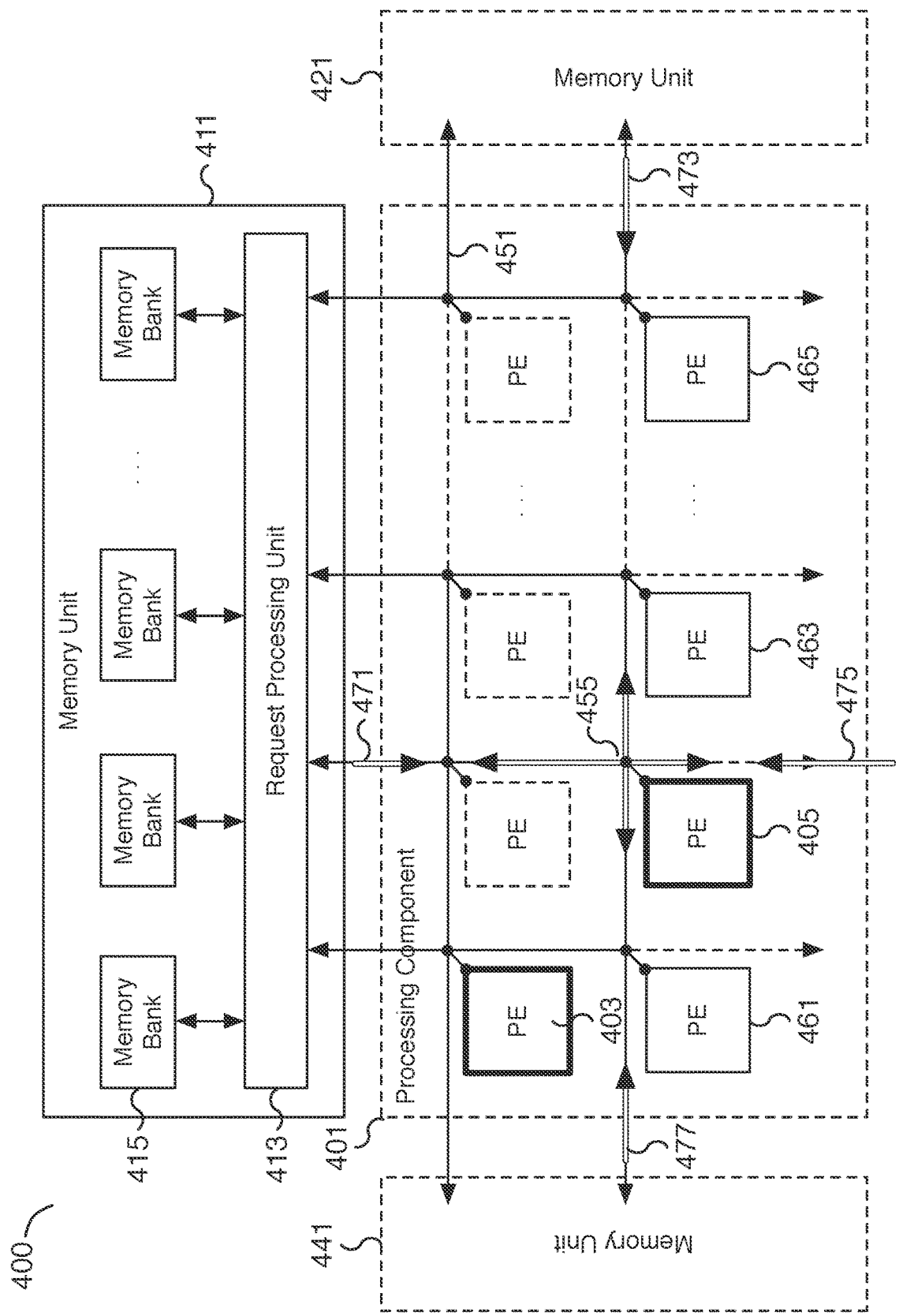
FIG. 4 is a block diagram illustrating an embodiment of a system for solving artificial intelligence problems using a neural network.

FIG. 4 is a block diagram illustrating an embodiment of a system for solving artificial intelligence problems using a neural network. In the example shown, the system 400 is a hardware platform that includes processing component 401 and memory units 411, 421, and 441. A fourth memory unit is not depicted in FIG. 4 but is located on the south side of processing component 401. Each memory unit includes a request processing unit and multiple memory banks. For example, memory unit 411 includes request processing unit 413 and memory banks such as memory bank 415. Each memory unit, such as memory unit 411, may be configured with additional (or fewer) memory banks than shown. The internal components of memory units 421 and 441 are not shown but resemble memory unit 411.

In some embodiments, processing component 401 is communicatively connected to memory units including memory units 411, 421, and 441 via multiple network connections. Processing component 401 includes an array of processing elements (each labeled "PE"), including processing elements 403, 405, 461, 463, and 465. Processing elements in bold, such as processing elements 403 and 405, are processing elements designated as request broadcasting masters. Some processing elements are shown with dashed lines to reflect the additional number of processing elements to fill out an array of processing elements and are processing elements that do not function as request broadcasting masters. The ellipses between processing elements indicate additional rows or columns of processing elements. The size of the array of processing elements can vary as appropriate. In some embodiments, processing component 401 includes an 8×8, 16×16, 32×32, or another appropriate sized array of processing elements. The outline of processing component 401 is dashed to depict that only a portion of processing component 401 is shown, emphasizing the relationship between processing component 401 and memory unit 411. In various embodiments, the relationship between processing component 401 and memory unit 411 is similar to how processing component 401 interacts with the remaining memory units.

In the example shown, network subsystem 451 communicatively connects the processing elements of processing component 401 to one another and to memory units 411, 421, and 441. On each side of processing component 401, multiple network connections connect processing component 401 to a memory unit. Processing element and request broadcasting master 403 broadcasts a memory access request to memory units, including memory units 411, 421, and 441, using network subsystem 451. Processing element and request broadcasting master 405 broadcasts a memory access request to memory units, including memory units 411, 421, and 441, using network route 455 on network subsystem 451. Responses from memory unit 411 traverse network route 471, using the same network interface the request is received from for memory unit 411. Similarly, responses from memory unit 421 traverse network route 473, using the same network interface the request is received from for memory unit 421 and responses from memory unit 441 traverse network route 477, using the same network interface the request is received from for memory unit 441. Responses from a memory unit (not shown) on the south side of processing component 401 traverse network route 475, using the same network interface the request is received from.

In some embodiments, processing elements of the same processing element group transmit memory requests to a request broadcasting master, such as request broadcasting master 403 or 405. The request broadcasting master merges the received requests from the processing elements of its group. For example, processing elements 405, 461, 463, and 465 are a row of processing elements and form a processing element group. Processing element 405 functions as the request broadcasting master of the group. As described with respect to FIG. 3, request broadcasting master 405 broadcasts a memory access request to all available memory units using network route 455 on behalf of all processing elements of the group. North side memory unit 411 and a south side memory unit (not shown) receive the broadcasted request via a north/south network communication line of network subsystem 451. East side memory unit 421 and west side memory unit 441 receive the broadcasted request via an east/west network communication line of network subsystem 451. The four directions the broadcast is transmitted are shown by network route 455. In various embodiments, the broadcasted request is a merged memory request that compresses a number of individual requests originating from processing elements of the same group, such as one or more of processing elements 405, 461, 463, and/or 465, and is broadcasted by request broadcast master and processing element 405.

In some embodiments, memory unit 411 includes request processing unit 413 and multiple memory banks such as memory bank 415. Request processing unit 413 receives broadcasted memory access requests from request broadcasting master and processing element 405 of processing component 401 via network route 455. The memory access requests may be read and/or write requests. Request processing unit 413 decomposes the memory access request to determine whether it can be served, potentially partially, by one of the memory banks of memory unit 411. Although four memory banks are shown in FIG. 4, in various embodiments, memory unit 411 can include fewer or many more memory banks (as represented by the ellipses) such as 8, 16, 32, 64, or another appropriate number of memory banks. In some embodiments, request processing unit 413 directs memory access requests to the appropriate memory bank(s) of memory unit 411. For example, based on the memory address of the request, request processing unit 413 determines the appropriate memory bank(s) to access. In some embodiments, two or more memory banks of memory unit 411 may be accessed for a single memory access request. The memory banks may be determined based on a hashing function. For example, the hashing function may utilize a workload identifier of the processing element associated with the original memory access request. In some embodiments, the hashing function inspects a set of bits, such as two or more bits, of a memory address associated with the memory access request. A memory access response is prepared by request processing unit 413 and transmitted to request broadcasting master 405 via network route 471. Request broadcasting master 405 transmits the response to the processing element from where the request initially originates. In some embodiments, each memory unit prepares and transmits partial responses to correspond to portions of the broadcasted memory request that each memory unit is responsible for. A completed response can be constructed from partial responses. In some embodiments, the construction of the complete response is performed by the request broadcasting master, such as request broadcasting master 405. In some embodiments, the construction of the complete response is performed by the original processing element using forwarded partial responses from the request broadcasting master. Similar to memory unit 411, the other memory units of system 400, including memory units 421, 441, and other memory units not shown, operate in a similar manner to respond to broadcasted memory requests.

In some embodiments, system 400 is system 100 of FIG. 1, processing component 401 is processing component 101 of FIG. 1, and memory units 411, 421, and 441 are memory units 111, 121, and 141, respectively, of FIG. 1. In some embodiments, system 400 is system 200 of FIG. 2, processing component 401 is processing component 201 of FIG. 2, memory units 411, 421, and 441 are memory units 211, 221, and 241, respectively, of FIG. 2, and network subsystem 451 is network subsystem 251 of FIG. 2. In some embodiments, system 400 is system 300 of FIG. 3, processing component 401 is processing component 301 of FIG. 3, memory units 411, 421, and 441 are memory units 311, 321, and 341, respectively, of FIG. 3, network subsystem 451 is network subsystem 351 of FIG. 3, request broadcasting master 405 is request broadcasting master 305 of FIG. 3, and network route 455 is network route 355 of FIG. 3.

Figure 5:
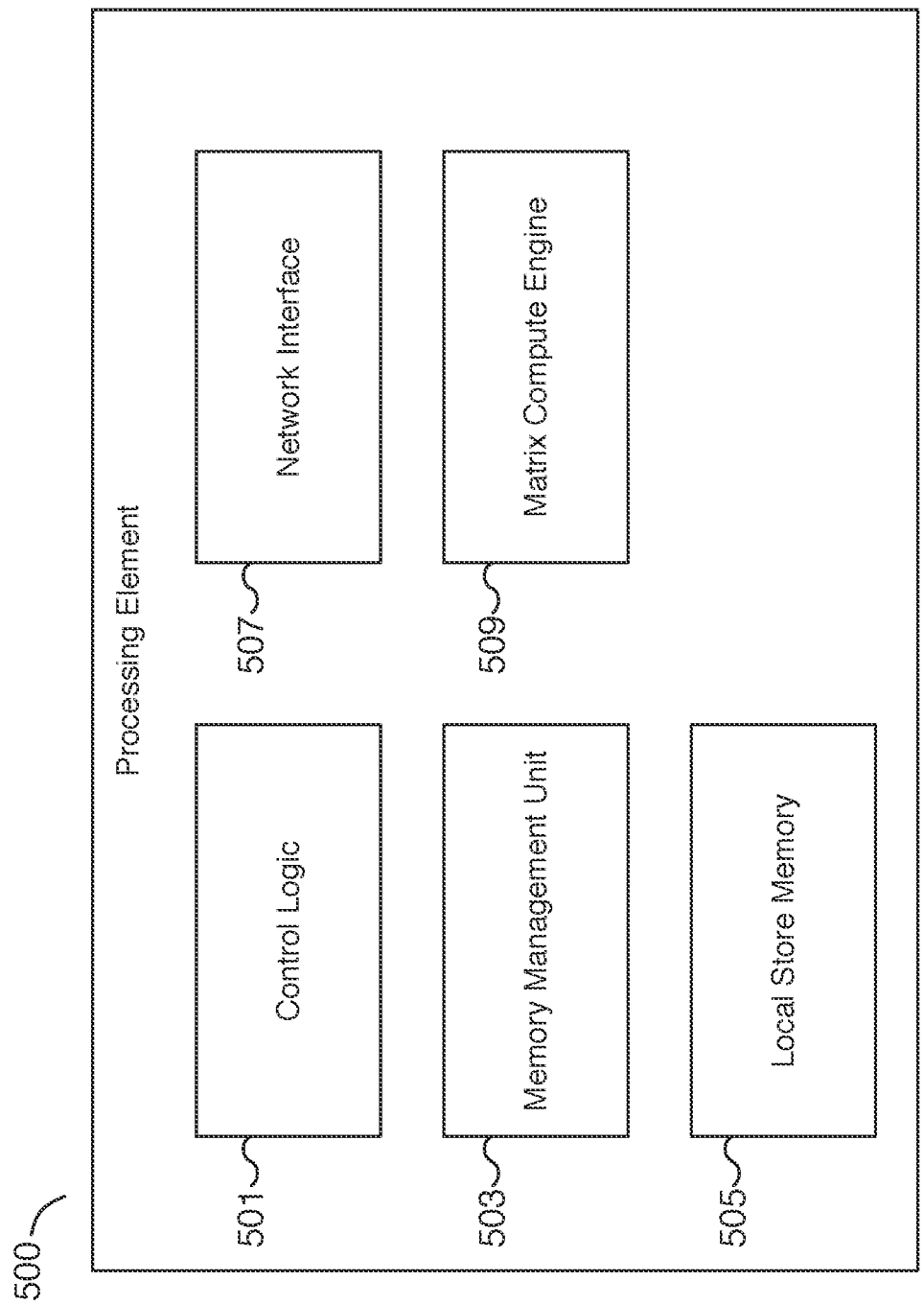
FIG. 5 is a block diagram illustrating an embodiment of a processing element for solving artificial intelligence problems using a neural network.

FIG. 5 is a block diagram illustrating an embodiment of a processing element for solving artificial intelligence problems using a neural network. In the example shown, processing element 500 includes control logic 501, memory management unit 503, local store memory 505, network interface 507, and matrix compute engine 509. In various embodiments, one or more processing elements can work together on the same data set or workload to solve an artificial intelligence program using a large working data set. In some embodiments, processing element 500 is a processing element of processing component 101 of FIG. 1, processing component 201 of FIG. 2, processing component 301 of FIG. 3, and/or processing component 401 of FIG. 4. In some embodiments, processing element 500 is processing element 203, 205, 207, 209, and/or another processing element of FIG. 2, processing element 303, 305, and/or another processing element of FIG. 3, and/or processing element 403, 405, 461, 463, 465, and/or another processing element of FIG. 4. In some embodiments, processing element 500 includes functionality as a request broadcasting master, such as request broadcasting masters 203, 205, and/or 207 of FIG. 2, 303 and/or 305 of FIG. 3, and/or 403 and/or 405 of FIG. 4.

In some embodiments, control logic 501 is a control logic unit for directing the functionality of processing element 500 and may be used to interface with the components of processing element 500 such as memory management unit 503, local store memory 505, network interface 507, and matrix compute engine 509. In some embodiments, control logic 501 may respond to processor instructions used to apply a neural network to an artificial intelligence problem. For example, control logic 501 can be used to initiate reading and/or writing of data from memory via network interface 507 in response to a processing instruction. In some embodiments, control logic 501 is used to load and prepare operating arguments for matrix compute engine 509. For example, control logic 501 can prepare matrix operands for computing a convolution operation. In some embodiments, control logic 501 is used to help process partial responses to a memory data request.

In some embodiments, processing element 500 functions as a request broadcasting master and control logic 501 implements the request broadcasting master functionality described herein. For example, control logic 501 is used to merge memory access requests from processing elements of the same group into a compressed or merged memory access request that is broadcasted to memory units. Control logic 501 is used to receive and process partial responses to the broadcasted request. In some embodiments, the request broadcasting master constructs a complete response from received partial responses before transmitting the complete response to the original requesting processing element. In some embodiments, the request broadcasting master forwards partial responses to the appropriate processing elements and each processing element itself constructs a complete response from received partial responses. In some embodiments, the request broadcasting master functionality is implemented in a component separate from control logic 501, such as a request broadcasting master (not shown).

In some embodiments, memory management unit 503 is used to manage memory related functionality of processing element 500. For example, memory management unit 503 may be used to program the access unit size used for reading data from and/or writing data to memory units such as memory units 111, 121, 131, and/or 141 of FIG. 1. In some embodiments, a large memory read is divided into access unit-sized groups and one of the available memory units is responsible for servicing each memory group. Distributing the data across memory units in access unit-sized groups allows memory to be accessed much more efficiently and significantly improves memory utilization. In some embodiments, memory management unit 503 is used to configure a hashing mechanism for distributing the data across different memory units. For example, memory management unit 503 can manage configurations associated with a programmable hashing mechanism. In some embodiments, memory management unit 503 is part of control logic 501. Instead of using a fixed distribution pattern for all memory access operations, the programmable hashing mechanism allows the distribution pattern to be configurable. For example, different processing element workloads can use different distribution patterns. As one example, one workload can be configured to write to memory units using a north, east, south, west pattern while another workload can be configured to write to the memory units using a south, north, east, west pattern. In various embodiments, the distribution scheme is dynamic and can be dynamically programmed via control logic 501 and memory management unit 503. Memory management unit 503 is used to help map local memory addresses to different memory access unit-sized groups found in different memory units.

In some embodiments, local store memory 505 is a memory scratchpad for storing data such as data related to neural network operations. Local store memory 505 may be used for storing data retrieved via partial responses to memory access requests. Partial responses and the associated data may be gathered and stored in local store memory 505 to build a complete response. In some embodiments, local store memory 505 is made up of registers for fast read and write access. In various embodiments, one or more components of processing element 500, such as matrix compute engine 509, can access local store memory 505. For example, matrix input data operands and/or output data results can be stored in local store memory 505.

In some embodiments, local store memory 505 is used by a processing element acting as a request broadcasting master to store memory requests from processing elements of the same group. For example, memory requests may be temporarily stored to create a merged memory request that can be broadcasted to available memory units. The merged memory request compresses multiple requests from one or more processing elements of the same group into a single memory request that requests the data referenced by the individual requests. In some embodiments, the merging operation utilizes local store memory 505. In various embodiments, local store memory 505 is used to direct responses received in response to the merged memory request back to the original processing element from which a memory access request originates. For example, the address of an originating processing element and the requested memory address range are stored in local store memory 505.

In some embodiments, network interface 507 is used to interface with a network subsystem such as a network-on-chip system for network communication. In some embodiments, the network subsystem that network interface 507 communicates with is network subsystem 251 of FIG. 2, network subsystem 351 of FIG. 3, and/or network subsystem 451 of FIG. 4. Memory access requests from and to processing element 500 such as read and write requests are transmitted via network interface 507. For example, memory access requests can be transmitted via network interface 507 to a request broadcasting master. Similarly, in some embodiments, a processing element functioning as a request broadcasting master receives memory requests from processing elements of the same group, broadcasts the merged memory access requests to memory units, and receives partial responses from memory units via network interface 507.

In some embodiments, matrix compute engine 509 is a hardware matrix processor unit for performing matrix operations including operations related to convolution operations. For example, matrix compute engine 509 may be a dot product engine for performing dot product operations. In some embodiments, the convolution operations supported include depthwise, groupwise, normal, regular, pointwise, and/or three-dimensional convolutions, among others. For example, matrix compute engine 509 may receive a first input matrix such as a subset of a large image represented as a three-dimensional matrix. The first input matrix may have the dimensions height×width×channel (HWC), channel× height×width (CHW), or another appropriate layout format. Matrix compute engine 509 may also receive a second input matrix such as a filter, kernel, or weights, etc. to apply to the first input matrix. Matrix compute engine 509 can be used to perform a convolution operation using the two input matrices to determine a resulting output matrix. In some embodiments, matrix compute engine 509 may include input and/or output buffers for loading input data matrices and writing out a result data matrix. The data used by matrix compute engine 509 may be read from and/or written to local store memory 505 and/or external memory such as memory units 111, 121, 131, and/or 141 of FIG. 1.

Figure 6:
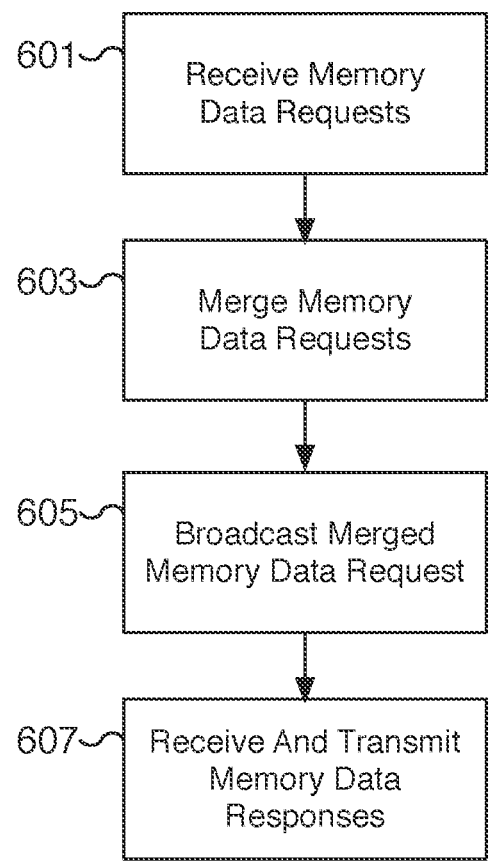
FIG. 6 is a flow chart illustrating an embodiment of a process for performing memory access.

FIG. 6 is a flow chart illustrating an embodiment of a process for performing memory access. For example, an artificial intelligence problem is solved by applying a neural network using data associated with the problem and the neural network. The data is read from and written to memory such as memory units 111, 121, 131, and/or 141 of FIG. 1 by a processing element such as processing elements 203, 205, 207, and/or 209 of FIG. 2 via a request broadcasting master such as request broadcasting master and processing elements 203, 205, and/or 207 of FIG. 2. In some embodiments, the process of FIG. 6 is performed by request broadcasting master 203, 205, and/or 207 of FIG. 2, request broadcasting master 303 and/or 305 of FIG. 3, and/or request broadcasting master 403 and/or 405 of FIG. 4. In some embodiments, the process of FIG. 6 is performed by processing element 500 of FIG. 5 when functioning as a request broadcasting master. Using the process of FIG. 6, data elements stored in memory can be distributed across multiple memory units to improve the utilization of memory and the efficiency of memory access operations.

At 601, memory access data requests are received. For example, memory access data requests are received at a request broadcasting master from one or more processing elements of the same group. In some embodiments, the memory access requests may be read or write requests. For example, a read request may specify a base address and a size. In some embodiments, the request includes an identifier such as a workload identifier that is used to determine which memory units are responsible for which portions of the requested data. In various embodiments, the transmission of a request from a processing element to a request broadcasting master includes implementing a network protocol that may include negotiating a connection between the processing element and the request broadcasting master. The negotiating the network connection may include performing a handshake, for example, related to setting up the network connection. In some embodiments, the network connection is used at 607 to transmit a response from memory to the originating processing element via the request broadcasting master.

In some embodiments, the identifier included in the memory access request is determined by initializing the processing element. For example, a particular memory access distribution scheme is using a processor instruction such as an instruction directed to a particular processing element. The distribution scheme may be associated with a particular workload such as a particular artificial intelligence problem and neural network. In some embodiments, the initialization includes setting a workload identifier. For example, a workload identifier can be used to configure how data is distributed across multiple memory units. The workload identifier may be a parameter to a processor memory management instruction. Each workload can use a different distribution scheme to improve the utilization and efficiency of memory. Processing elements working on the same dataset or workload can utilize the same workload identifier to share data. By scattering data across memory units using different distribution patterns, such as different distribution patterns for each workload, the data stored in memory is more efficiently distributed across all available memory. In some embodiments, the memory initialization includes configuring the memory access unit size. For example, a memory access unit, such as 128 bytes, 256 bytes, etc., can be configured such that data is written to each memory unit in access unit-sized groups. Larger or smaller access units can be used as appropriate. Data within an access unit group is stored in the same memory unit. In some embodiments, the access unit size is configurable using a programmable instruction to a processor or processing element.

In some embodiments, processing element initialization includes configuring or programming a hashing mechanism for distributing data across memory units. For example, a hashing mechanism can utilize a seed to configure the distribution scheme. In some embodiments, the seed is based on specifying a group of bits from a memory address to determine which memory unit is assigned to a particular access unit of data. For example, the hashing mechanism may specify two bits of the memory address, such as two upper bits, and perform a bitwise operation on the specified bits to map an access unit to a memory unit. In some embodiments, the bitwise operation utilizes an XOR operation. In some embodiments, the hashing mechanism can be programmatically configured. For example, a processing element can be configured to utilize a specified hashing function and/or be configured to utilize certain parameters for the hashing function.

At 603, memory data requests are merged. Using the memory access data requests received at 601 from one or more processing elements, a request broadcasting master merges the requests into a merged memory data request. By merging multiple requests, the number of total requests to memory units is reduced. Merging requests reduces the amount of network traffic and significantly reduces the number of potential collisions. In some embodiments, the merged data request includes identifier information for determining the dynamically programmable distribution scheme each memory request utilizes. In some embodiments, two or more processing elements may request the same or overlapping data. At 603, the duplicative requests are merged into a single request and the requesting processing elements can rely on the same response.

At 605, a merged memory data request is broadcasted to all memory units. For example, the merged memory access data request created at 603 is broadcasted by a request broadcasting master to all memory units. The request traverses the network subsystem using a network route that includes only the communication lines along the row and column of the request broadcasting master to reach available memory units. Request broadcasting masters are located along the diagonal of the processing elements array and therefore each have a unique pair of column and row communication lines. The broadcasted requests for each request broadcasting master have minimal network overlap with broadcasts from other request broadcasting masters and their respective responses.

In some embodiments, the network subsystem used for the broadcast is a network-on-chip subsystem such as network subsystem 251 of FIG. 2, 351 of FIG. 3, and/or 451 of FIG. 4. Examples of network routes a broadcast traverses include network route 353 and 355 of FIG. 3 and network route 455 of FIG. 4. In some embodiments, four memory units, such as a north, east, south, and west memory unit, surround a processing component such as processing component 101 of FIG. 1. In the example, all four memory units, such as memory units 111, 121, 131, and 141, receive the broadcasted memory data request. In some embodiments, the data request is for a large amount of data and includes data spanning multiple access units. The request can be constructed to reference at least a base memory address and a size argument to determine how much data is requested starting at the base memory address. In some embodiments, multiple base addresses and sizes are merged together into the merged memory request. Other memory referencing schemes may be appropriate as well. In some embodiments, the broadcasted memory request also includes mapping information corresponding to the distribution scheme. For example, receiving memory units can use the mapping information to determine the programmatically configured hashing mechanism and/or hashing mechanism parameter(s) used by the processing element initiating the request. As another example, the mapping information may also include the programmatically configured access unit size. In various embodiments, the memory data request may be provided to memory units for reading data or writing data.

At 607, memory data responses are received and transmitted. For example, partial memory data responses are received from memory units at the request broadcasting master. Each partial memory data response corresponds to a requested portion of the memory access request broadcasted at 605. For example, two or more partial memory data responses are received from two or more different memory units. Since the memory request spans multiple access units, multiple memory units can respond, each providing a partial response corresponding to different access units, to complete the entire request. Each memory unit creates one or more partial responses associated with the one or more access units it is responsible for. For example, data associated with a memory request can be spread across three memory units. Each of the three memory units responds with a partial memory data response. At 607, the partial memory responses are received. In some embodiments, each response includes an identifier such as a sequence identifier for organizing the partial responses into a complete response.

In some embodiments, once a partial response is received, the response is provided to the original processing element that generated the memory access data request received at 601. In various embodiments, the responses are partial responses and require multiple partial responses to construct a complete response. Each partial response is forwarded by the request broadcasting master to the originating processing element for that processing element to construct a complete response. In various embodiments, the network connection utilized for transmitting the responses was created at 601 to receive the original memory request.

In some embodiments, the partial responses are stored at the request broadcasting master and a complete response is constructed from the partial responses by the request broadcasting master. Once a complete response is constructed, the request broadcasting master provides the completed response to the originating processing element. For example, a request broadcasting master stores the necessary data of received partial responses from memory units until all the data needed to construct a full response has been received. Once a complete response can be constructed, the request broadcasting master transmits the completed response to the originating processing element. Instead of forwarding partial responses, the request broadcasting master forwards only a completed response. In some embodiments, having the request broadcasting master construct a complete response minimizes the network traffic among the group of processing elements since only complete responses are forwarded and not every partial response.

Figure 7:
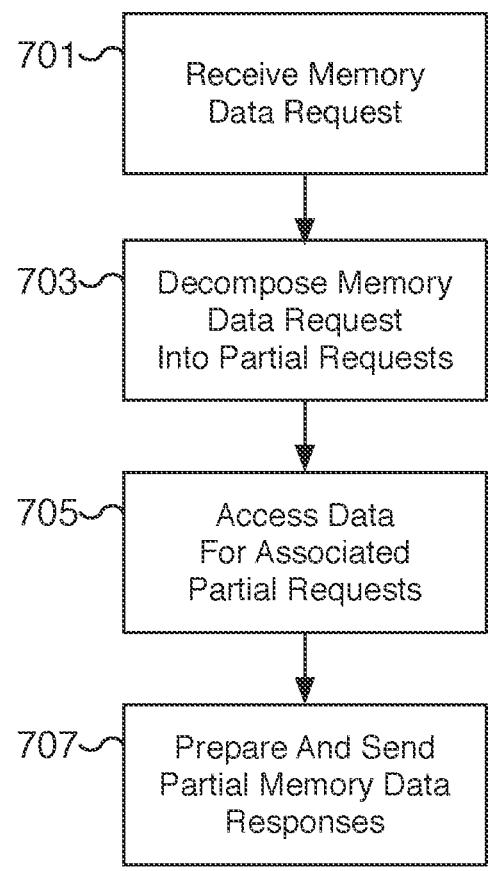
FIG. 7 is a flow chart illustrating an embodiment of a process for responding to memory data requests.

FIG. 7 is a flow chart illustrating an embodiment of a process for responding to memory data requests. For example, a memory unit utilizes the process of FIG. 7 to respond to a broadcasted memory data request. The memory unit decomposes the memory request and determines which access units the memory unit is responsible for and then prepares and sends one or more partial responses for the access units managed by the memory unit. In some embodiments, the process of FIG. 7 is performed by memory units 111, 121, 131, and/or 141 of FIG. 1 and/or the memory units of FIGS. 2-4. In some embodiments, the process of FIG. 7 is performed in response to a memory data request broadcasted at 605 of FIG. 6. In some embodiments, the response prepared using the process of FIG. 7 is received by a request broadcasting master, such as request broadcasting master 203, 205, and/or 207 of FIG. 2, request broadcasting master 303 and/or 305 of FIG. 3, and/or request broadcasting master 403 and/or 405 of FIG. 4.

At 701, a memory data request is received. For example, a memory data request spanning multiple access units is received. Some of the access units are associated with the memory unit and others may be associated with a different memory unit. In various embodiments, multiple memory units may receive the same memory data request as a broadcasted memory data request. In some embodiments, the memory data request includes a base address and a size parameter to determine the address range requested. The memory data request may also include mapping information to determine the hashing mechanism and/or hashing mechanism parameter(s) used for the particular memory distribution scheme of the memory access request. In some embodiments, memory data request mapping information includes the access unit size.

At 703, the memory data request is decomposed into partial requests. For example, a request spanning multiple access units is split into partial requests. In some embodiments, the decomposing is performed by unrolling the memory data request into partial requests based on a configured access unit size. For example, a memory data request spanning three access units is decomposed into three partial requests, one for each access unit. As another example, in some embodiments, each memory unit is responsible for multiple access units. For example, in a scenario with a memory data request spanning 32 memory access units that are evenly distributed across four memory units, each memory unit is responsible for eight partial requests. Each partial request corresponds to a memory access unit of data managed by the memory unit.

At 705, data for associated partial requests is accessed. For example, data of access units that match a partial request are retrieved from (or written to) memory banks of the memory unit. In some embodiments, a memory unit may have multiple memory banks and the data of the corresponding partial requests is stored in one or more memory banks of the memory unit. In some embodiments, the data accessed is in response to a partial request decomposed from a larger request spanning multiple access units. In the case of a memory access read operation, the corresponding data is read from memory banks of the memory unit in the event the partial request matches to the memory unit. Similarly, in the case of a memory access write operation, the corresponding data is written to memory banks of the memory unit in the event the partial request matches to the memory unit.

In some embodiments, a partial request is mapped with a corresponding memory unit based on a programmable distribution scheme. For example, different workloads can distribute data to memory units using different distribution schemes configured using a hashing mechanism. In various embodiments, at 705, the hashing mechanism for the configured distribution scheme is used to determine whether the memory unit receiving the memory data request is responsible for the partial request. In the event the memory unit manages that particular address range of the partial request, the corresponding data is retrieved (or written). Otherwise, the partial request is ignored and will be handled by the correct memory unit responsible for that address range.

At 707, partial memory data responses are prepared and sent. For example, data read from memory units is packaged into responses associated with partial requests. In some embodiments, the response prepared corresponding to a read operation is a partial memory data response since it includes only a portion of the requested data. In various embodiments, each partial response includes an identifier such as a sequence identifier for ordering the partial responses into a complete response. The identifier of each partial memory data response can be utilized by a request broadcasting master to order a set of partial responses that are received out of order. The response is transmitted to a request broadcasting master for one or more processing elements to receive. In some embodiments, the response is an acknowledgement that a request corresponding to the write operation is complete.

Figure 8:
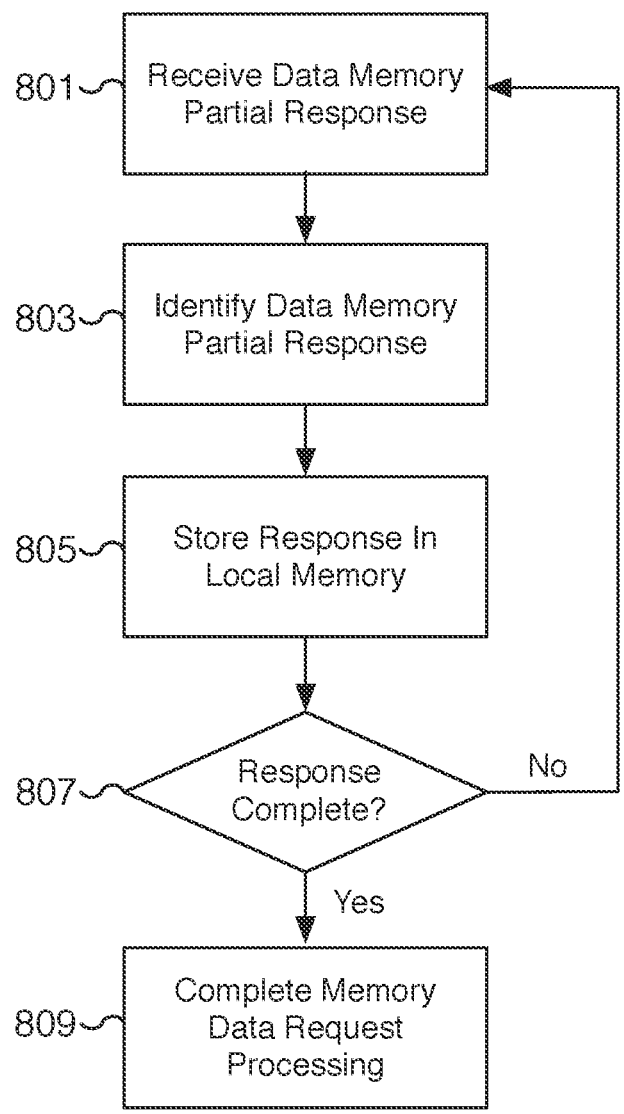
FIG. 8 is a flow chart illustrating an embodiment of a process for performing memory access.

FIG. 8 is a flow chart illustrating an embodiment of a process for performing memory access. For example, a request broadcasting master utilizes the process of FIG. 8 to gather data corresponding to a memory data request for a read operation. In some embodiments, a request broadcasting master, such as request broadcasting master 203, 205, and/or 207 of FIG. 2, request broadcasting master 303 and/or 305 of FIG. 3, and/or request broadcasting master 403 and/or 405 of FIG. 4, receives partial memory data responses from multiple memory units such as memory units 111, 121, 131, and/or 141 of FIG. 1 and/or the memory units of FIGS. 2-4. In some embodiments, the process of FIG. 8 is performed by the processing element from which a memory access request originates and not by a request broadcasting master. For example, the request broadcasting master forwards received partial responses to the originating processing element for the originating processing element to construct a complete response from the partial responses. In some embodiments, the process of FIG. 8 is performed in response to a memory data request broadcasted at 605 of FIG. 6 and/or in response to partial memory data responses sent using the process of FIG. 7. In some embodiments, the process of FIG. 8 is performed at 607 of FIG. 6 to gather partial responses from a variety of memory units.

At 801, a data memory partial response is received. For example, a partial response to a data memory request sent from a memory unit is received. In various embodiments, the response includes data that is one or more access units in size from the same memory unit. In some embodiments, the response includes identifier information such as a sequence identifier that can be used to order the partial response received relative to other partial responses.

At 803, the data memory partial response is identified. For example, using an identifier included in the received partial response, the data memory partial response is identified relative to the original data memory request. For example, a request may be decomposed or unrolled into five partial requests. The partial response is identified at 803 to determine which of the five partial responses it corresponds to. In some embodiments, the identification is performed by inspecting an identifier such as a sequence identifier. The identification result can be used to determine the ordering of the partial response relative to other partial responses and to reconstruct a complete response from the set of received partial responses.

At 805, a data memory partial response is stored in local memory. For example, data read from memory is extracted from the data payload of a partial response and stored in local memory. In some embodiments, a temporary buffer sized for the requested data is allocated from local memory to construct a complete response from partial responses. Since partial responses may be received out of order relative to their corresponding memory addresses, the data from the partial response is stored in the allocated buffer at a corresponding location based on the relationship of the partial response to the original requested data. For example, a buffer sized for five partial responses is allocated and the data from the received partial response is written to a corresponding address location in the buffer regardless of when the partial response is received. In some embodiments, each partial response is an access unit-sized response or a multiple of an access unit. In various embodiments, the local memory is local memory store 505 of FIG. 5. Using the temporary buffer, a completed data memory response can be reconstructed from partial responses.

At 807, a determination is made whether the response is complete. For example, a response is complete once all partial responses that are required to construct a completed response are received. In the event the response is complete, processing proceeds to 809. In the event the response is not complete, processing loops back to 801 to receive an additional partial response.

At 809, memory data request processing is completed. For example, the data corresponding to a complete response is made available for additional computation such as matrix computation. In some embodiments, the data associated with the completed response is located in local memory such as a local memory store of the processing element. The completed response may be used as input to a matrix compute engine of the processing element and/or distributed to other processing elements. For example, other processing elements associated with the request broadcasting master receive their corresponding requested data. In some embodiments, the completed response corresponds to data describing a neural network or activation data associated with an artificial intelligence problem.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a plurality of memory units; and
   a processor coupled to each of the plurality of memory units by a plurality of network connections, wherein the processor includes a plurality of processing elements arranged in a two-dimensional array and a corresponding two-dimensional communication network communicatively connecting each of the plurality of processing elements to other processing elements on same axes of the two-dimensional array, and wherein each processing element of the plurality of processing elements located along a diagonal of the two-dimensional array is configured as a request broadcasting master for a respective group of processing elements of the plurality of processing elements located along a same axis of the two-dimensional array.

2. The system of claim 1, wherein each processing element of the plurality of processing elements includes a matrix compute engine, a network interface, and a control logic.

3. The system of claim 2, wherein the control logic is configured to provide a memory request to the request broadcasting master for the respective group of processing elements and to access data from the plurality of memory units using a dynamically programmable distribution scheme.

4. The system of claim 1, wherein the request broadcasting master for the respective group of processing elements is configured to receive a plurality of memory requests from the plurality of processing elements of the respective group.

5. The system of claim 4, wherein the request broadcasting master is configured to merge the plurality of memory requests into a compressed memory request.

6. The system of claim 5, wherein the request broadcasting master is configured to broadcast the compressed memory request to the plurality of memory units.

7. The system of claim 6, wherein the request broadcasting master is configured to receive partial memory responses in response to the broadcasted compressed memory request from the plurality of memory units.

8. The system of claim 6, wherein the broadcasted compressed memory request references data stored in each of the plurality of memory units.

9. The system of claim 6, wherein each of the plurality of memory units is configured to decompose the broadcasted compressed memory request into a corresponding plurality of partial requests.

10. The system of claim 9, wherein each of the plurality of memory units is configured to determine whether each of the corresponding plurality of partial requests corresponds to data stored in a corresponding one of a plurality of memory banks associated with the corresponding memory unit.

11. The system of claim 10, wherein each of the plurality of memory units is configured to provide a partial response associated with a different one of the corresponding plurality of partial requests.

12. The system of claim 11, wherein the partial response includes a corresponding sequence identifier that orders the partial response among a plurality of partial responses.

13. The system of claim 6, wherein the each request broadcasting master is configured to receive partial responses, combine the partial responses to generate a complete response to the broadcasted compressed memory request, and provide the complete response to a processing element of the respective group of processing elements.

14. The system of claim 6, wherein the each request broadcasting master is configured to receive partial responses, match each of the partial responses to a processing element of the respective group of processing elements, and forward each of the matched partial responses to the corresponding matched processing element.

15. The system of claim 1, wherein the each request broadcasting master located along the diagonal of the two-dimensional array is configured to provide memory requests to and receive responses from the plurality of memory units using a different network connection of the plurality of network connections.

16. The system of claim 1, wherein the plurality of memory units includes a north memory unit, an east memory unit, a south memory unit, and a west memory unit.

17. A method comprising:
receiving a first memory request associated with a first processing element of a first processing element group of a plurality of processing element groups, wherein each processing element group of the plurality of processing element groups is located on a different row of a two-dimensional array of processing elements;
receiving a second memory request associated with a second processing element of the first processing element group;
merging the first memory request and the second memory request into a compressed memory request;
broadcasting the compressed memory request to a plurality of memory units; and
receiving from the plurality of memory units a plurality of partial responses associated with the compressed memory request.

18. The method of claim 17, further comprising:
combining the plurality of partial responses to create a first complete response to the first memory request and a second complete response to the second memory request;
providing the first complete response to the first processing element; and
providing the second complete response to the second processing element.

19. The method of claim 17, further comprising:
matching a first set of partial responses of the plurality of partial responses with the first memory request;
matching a second set of partial responses of the plurality of partial responses with the second memory request;
providing the first set of partial responses to the first processing element; and
providing the second set of partial responses to the second processing element.

20. A system, comprising:
a plurality of memory units, wherein at least one of the plurality of memory units is configured to decompose a broadcasted compressed memory request into a corresponding plurality of partial requests; and
a processor coupled to each of the plurality of memory units by a plurality of network connections, wherein the processor includes a plurality of processing elements arranged in a two-dimensional array and a corresponding two-dimensional communication network communicatively connecting each of the plurality of processing elements to other processing elements on same axes of the two-dimensional array, and wherein each processing element of the plurality of processing elements located along a diagonal of the two-dimensional array is configured as a request broadcasting master for a respective group of processing elements of the plurality of processing elements located along a same axis of the two-dimensional array.

* * * * *